(12) United States Patent
Schaefer et al.

(10) Patent No.: US 6,601,692 B2
(45) Date of Patent: Aug. 5, 2003

(54) DEVICE FOR CLEANING ENDLESS CONVEYORS

(75) Inventors: Harold G. Schaefer, Hubertus, WI (US); Anthony A. Brooks, New Berlin, WI (US)

(73) Assignee: Schaefer Brush Manufacturing, Waukesha, WI (US)

( * ) Notice: Subject to any disclaimer, the term of this patent is extended or adjusted under 35 U.S.C. 154(b) by 0 days.

(21) Appl. No.: 09/904,640

(22) Filed: Jul. 13, 2001

(65) Prior Publication Data

US 2003/0010604 A1 Jan. 16, 2003

(51) Int. Cl.⁷ .............................................. B65G 45/18
(52) U.S. Cl. ...................... 198/496; 198/498; 198/816; 198/813
(58) Field of Search ................................. 198/496, 816, 198/498, 813, 814, 815

(56) References Cited

U.S. PATENT DOCUMENTS

| | | | | |
|---|---|---|---|---|
| 3,139,975 A | * | 7/1964 | Schaefer | 198/230 |
| 3,229,808 A | * | 1/1966 | Olson | 198/229 |
| 3,893,553 A | * | 7/1975 | Hansen | 192/56 R |
| 4,079,834 A | * | 3/1978 | Fletcher, Jr. et al. | 198/810 |
| 4,128,164 A | * | 12/1978 | Sandberg | 198/813 |
| 4,366,899 A | * | 1/1983 | Doro | 198/781 |
| 4,825,997 A | * | 5/1989 | Bowman et al. | 198/499 |
| 5,143,207 A | * | 9/1992 | Pruett | 198/814 |
| 5,259,495 A | * | 11/1993 | Douglass | 198/404 |
| 5,301,797 A | * | 4/1994 | Hollyfield, Jr. et al. | 198/499 |
| 5,400,897 A | * | 3/1995 | Doyle | 198/496 |
| 5,501,320 A | * | 3/1996 | Chipcase | 198/810.04 |
| 5,511,650 A | * | 4/1996 | Hurworth | 178/813 |
| 5,519,480 A | * | 5/1996 | Thaayer et al. | 355/301 |
| 5,649,616 A | * | 7/1997 | Stecklow | 198/496 |
| 5,671,838 A | * | 9/1997 | Bowman | 198/496 |
| 5,746,302 A | * | 5/1998 | Bowman | 198/496 |
| 5,779,024 A | * | 7/1998 | Harper | 198/496 |
| 5,984,083 A | * | 11/1999 | Hosch et al. | 198/810.04 |
| 6,189,681 B1 | * | 2/2001 | England | 198/496 |

* cited by examiner

Primary Examiner—Christopher P. Ellis
Assistant Examiner—Rashmi Sharma
(74) Attorney, Agent, or Firm—Boyle Fredrickson Newholm Stein & Gratz S.C.

(57) ABSTRACT

A device is provided for cleaning an endless conveyor. The device includes an endless brush belt engageable with the endless conveyor. A tension mechanism is provided for placing a tension on the endless brush belt. A clutch mechanism is operatively connected to the tension mechanism. The clutch mechanism prevents the placement of additional tension on the endless brush belt in response to tension exceeding a predetermined maximum tension.

26 Claims, 7 Drawing Sheets

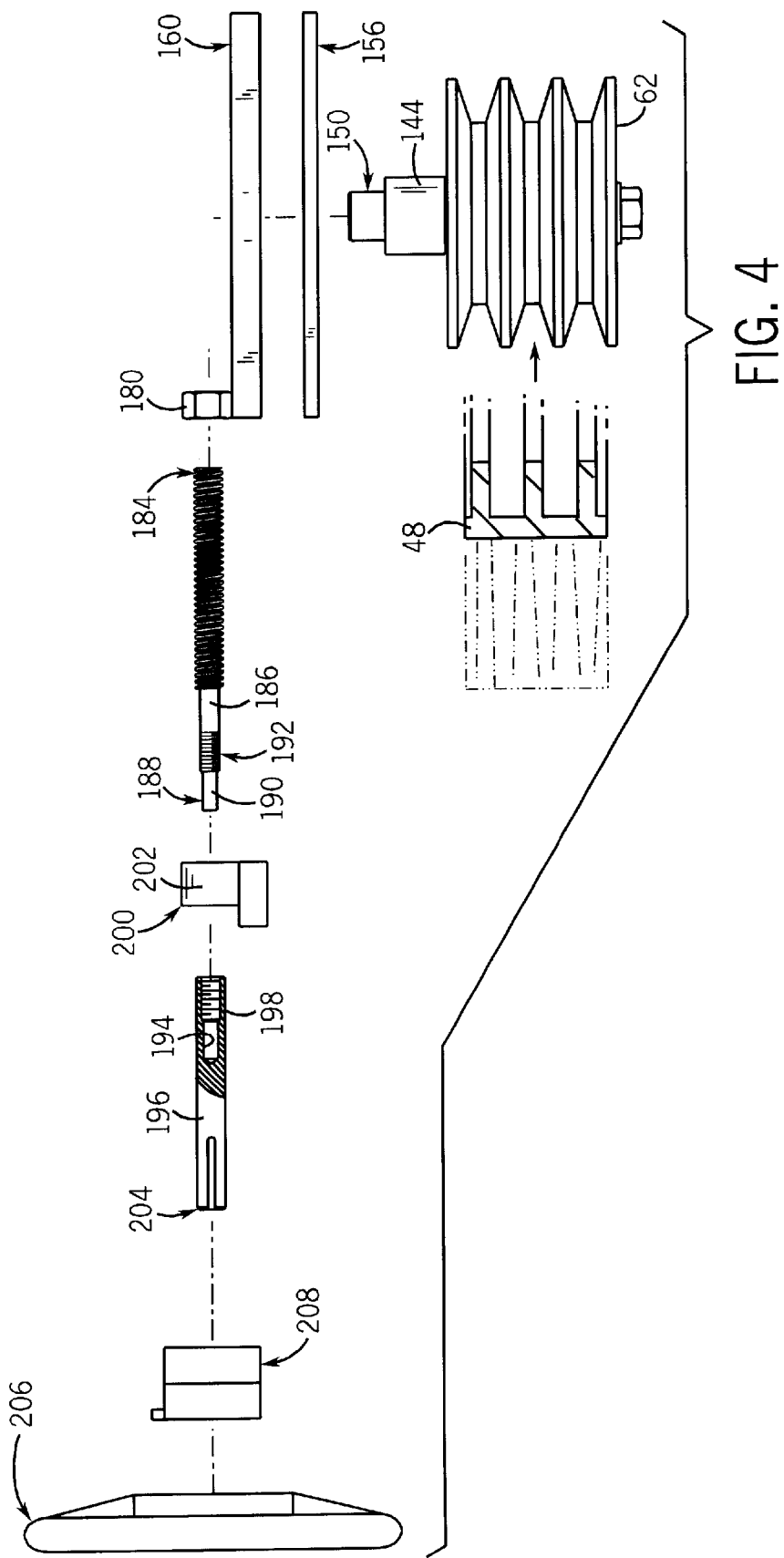

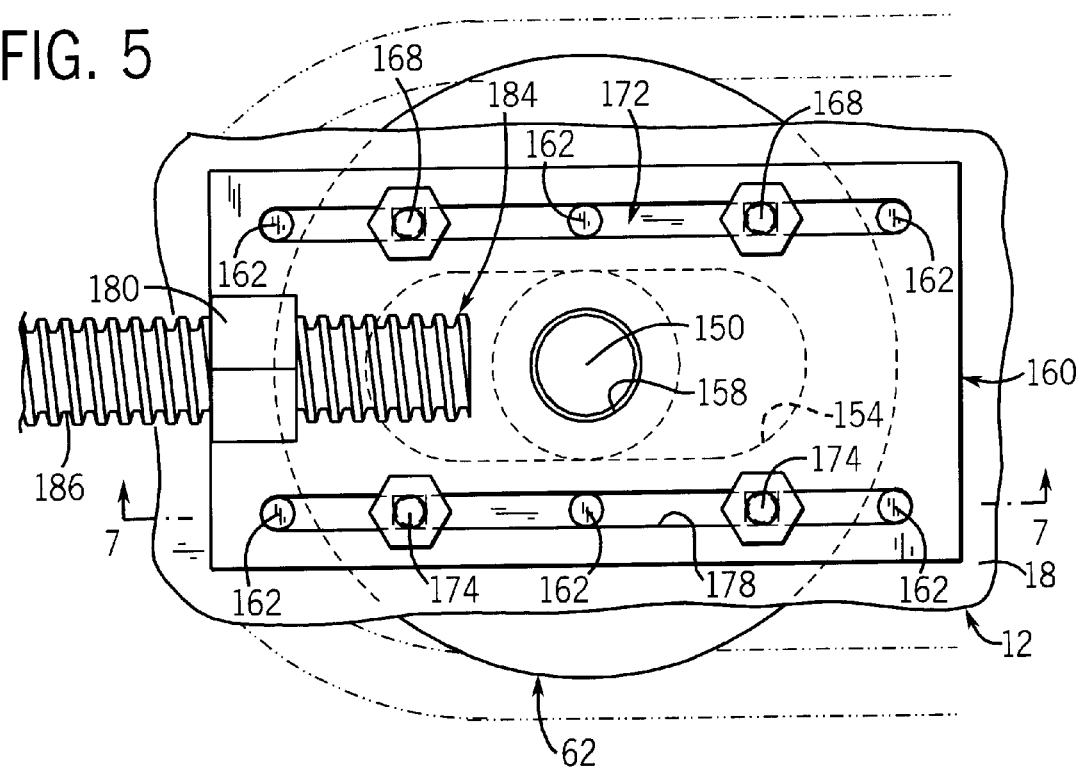
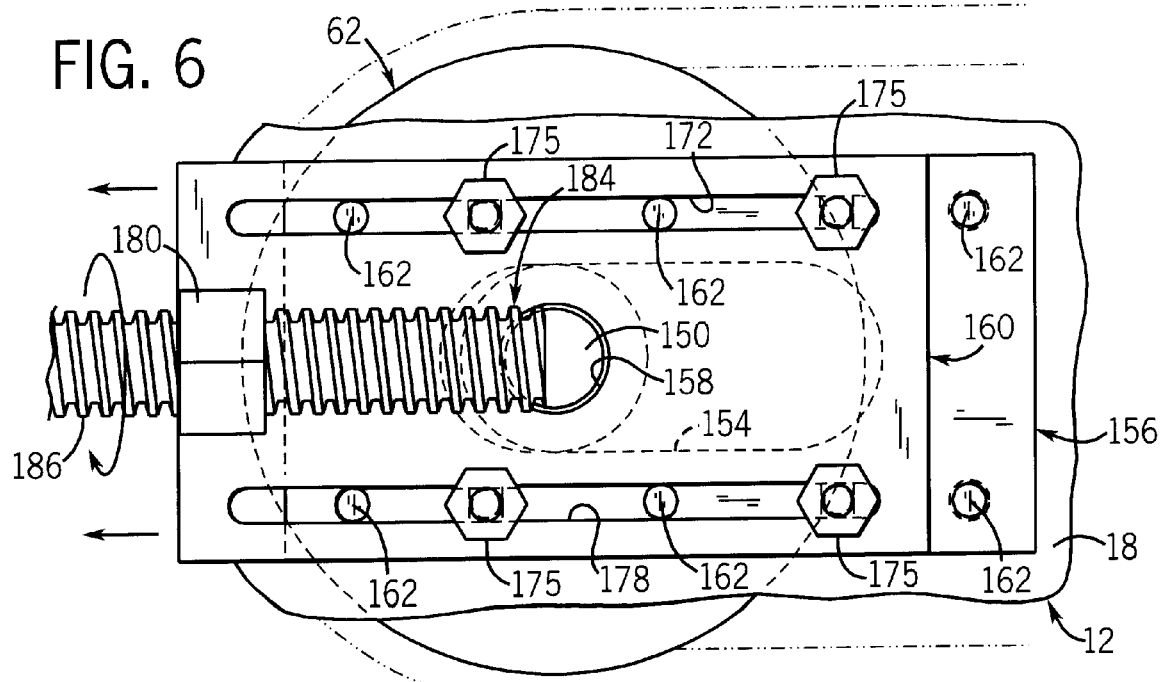

DEVICE FOR CLEANING ENDLESS CONVEYORS

FIELD OF THE INVENTION

This invention relates generally to endless conveyors, and in particular, to a device for cleaning endless containers during operation of the same.

BACKGROUND AND SUMMARY OF THE INVENTION

Endless conveyors are used in a wide variety of applications, including mining or similar operations for transporting bulk material. When a belt or slat-type endless conveyor is used in mining or similar operations, a substantial quantity of the bulk material may adhere to the surface of the conveyor belt. The bulk material adhered to the surface of the conveyor belt not only may damage the belt, but may also cause damage to the mechanism for driving the endless conveyor. As a result, various devices have been developed for cleaning such conveyors.

By way of example, Schaefer, U.S. Pat. No. 3,139,975 discloses an improved device for cleaning an endless conveyor. The device disclosed in the Schaefer '975 patent includes an elongated frame which supports first and second double sheaves on opposite ends thereof. A pair of endless V-belts having rows of brushes mounted on the outer surfaces thereof extend about the double sheaves. A driving mechanism is provided for driving the endless V-belts about the double sheaves. In operation, the device disclosed in the Schaefer '975 patent is positioned below a belt or slat-type endless conveyor such that the brushes projecting from the outer surfaces of the V-belts engage the underside of the endless conveyor. As the endless conveyor travels along its path, the V-belts are driven by the driving mechanism along a path which is transverse to the path of the endless conveyor such that the brushes extending from the outer surfaces of the V-belts pressurably engage and move across the underside of the conveyor to disengage any of the bulk material adhering thereto.

While functional for its intended purpose, the device provided for in the Schaefer '975 patent has certain limitations. As is known, it is often necessary to adjust the tension on the V-belts of the cleaning device in order to effectively remove the bulk material from the surface of the endless conveyor being cleaned. However, it has been found that excess tension placed on the V-belts may damage the sheaves, as well as, cause premature wearing of the V-belts. Therefore, it is highly desirable to provide a mechanism for limiting the tension an individual may place on the V-belts so as to prevent damage to the device for cleaning the endless conveyor.

Therefore, it is the primary object and feature of the present invention to provide a device for cleaning endless conveyors which utilizes a brush belt maintained at a user selected tension.

It is a further object and feature of the present invention to provide a device for cleaning an endless conveyor which incorporates a mechanism for preventing the over tensioning of the belt brush thereof.

It is a still further object and feature of the present invention to provide a device for cleaning an endless conveyor which is simple and inexpensive to manufacture.

In accordance with the present invention, a device is provided for cleaning an endless conveyor. The device includes first and second sheaves spaced along the longitudinal axis and rotatably supported above a supporting surface. Each sheave is rotatable about a corresponding axis transverse to the longitudinal axis and includes a radially outer surface. An endless brush belt extends about the radially outer surfaces of the sheaves. The endless brush belt has an outer surface engageable with the endless conveyor. The endless brush belt travels about the sheaves in response to rotation of the first sheave. A drive structure is operatively connected to the first sheave for rotating the same. A tension mechanism is operatively connected to one of the sheaves for adjusting the spacing therebetween and for providing a tension on the endless brush belt. A clutch mechanism is operatively connected to the tension mechanism. The clutch mechanism prevents the placement of additional tension on the endless brush belt in response to the tension exceeding a predetermined maximum tension.

It is contemplated to support the sheaves above the supporting surface at a user selected height. The device may include a height adjustment mechanism operatively connected to at least one of the sheaves for allowing the user to adjust the height of sheaves above the supporting surface to the user selected height. A frame, generally parallel to the longitudinal axis, supports the sheaves above the supporting surface. The second sheave is rotatably about the shaft having a predetermined diameter and a terminal end. The shaft is slidable about the longitudinal axis. The tension mechanism is operatively connected to the shaft. The tension mechanism slides the shaft along the longitudinal axis between a first position providing maximum space between sheaves and a second position providing minimum space between the sheaves. A locking structure interconnects the shaft to the frame at a user selected position along the longitudinal axis.

The frame may include an opening therethrough. The shaft extends through the opening in the frame and has a plate interconnected to the terminal end thereof. The plate is slidable along the frame between a first position providing a minimal spacing between the sheaves and the second position providing a maximum spacing between the sheaves. A locking structure maintains the plate at a user selected position with respect to the frame.

The tension mechanism includes a nut extending from the first side of the plate and a lead screw extending along an axis parallel to the longitudinal axis. The lead screw has first end extending through a nut and a second opposite end wherein rotation of the lead in a first direction causes the nut to travel along the lead screw towards the first end thereof and rotation of the lead screw in a second, opposite direction causes the nut to travel towards the second end thereof. A handle is provided for turning the lead screw. The handle is interconnected to the lead screw by a clutch mechanism such that the handle is prevented from turning the lead screw in response to the tension on the endless brush belt exceeding the predetermined maximum tension.

In accordance with a further aspect of the present invention, a device is provided for cleaning an endless conveyor. The device includes a support frame extending along a longitudinal axis and having first and second opposite ends. The support frame is supported above a supporting surface. A rotatable drive shaft extends laterally from the support frame along an axis transfers through the longitudinal axis of the support frame. A drive sheave assembly is supported on the drive shaft. The drive sheave assembly includes a spindle housing, a drive sheave, a bearing assembly and a coupling structure. The spindle housing has an inner surface which defines the passageway for receiving the drive shaft therethrough and an outer surface. The spindle housing is connected to the support frame. The drive sheave has an inner surface and an outer surface. The bearing assembly is positioned between the outer surface of the spindle housing and the inner surface of the drive sheave to facilitate rotation of the drive sheave on the spindle housing. The coupling structure interconnects the drive sheave and the drive shaft. A driven sheave is rotatably supported by the support frame at a spaced location from the drive sheave. The driven sheave is rotatable about a corresponding axis transverse to the longitudinal axis and includes a radially outer surface. An endless brush belt extends about the radially outer surfaces of the drive sheave and the driven sheave. The endless brush belt has an outer surface engageable with the endless conveyor. The endless brush belt travels about the sheaves in response to rotation of the drive shaft. A drive mechanism is operatively connected to the drive shaft for rotating the drive shaft. A tension mechanism is operatively connected to the driven sheave for adjusting the spacing between the drive sheave and the driven sheave so as to provide a tension on the endless brush belt.

The coupling structure includes a locking screw clamp positioned on the outer surface of the drive shaft. The locking screw clamp includes an outer contact surface for frictionally engaging the inner surface of the drive sheave. The locking screw clamp has an outer diameter which is adjustable between a first reduced diameter and a second enlarged diameter wherein rotation of the drive shaft is translated to the drive sheave.

A clutch mechanism is operatively connected to the tension mechanism. The clutch mechanism prevents the adding of the tension on the endless brush belt in response to the tension exceeding the predetermined maximum tension. The driven sheave is rotatably supported on the driven shaft which extends laterally from the support frame. The driven shaft has a predetermined diameter and is slidable along the longitudinal axis of the support frame. The tensioning mechanism is operatively connected to the driven shaft. The tensioning mechanism slides the driven shaft along the longitudinal axis of the support frame between a first position providing minimal spacing between the drive sheave and the driven sheave and a second position providing maximum spacing between the drive sheave and the driven sheave. A locking structure interconnects the driven shaft to the frame at a user selected position along the longitudinal axis. The support frame includes an opening therethrough for receiving the driven shaft. A tension mechanism includes a plate interconnected to the terminal end of the driven shaft. The plate is slidable along the support frame between a first position providing minimal spacing between the drive sheave and the driven sheave and a second position providing a maximum spacing the drive sheave and the driven sheave. A locking structure maintains the plate at a user selected position with respect to the support frame.

It is contemplated that the tension mechanism include a nut extending from the first side of the plate and a lead screw rotatable along an axis generally parallel to the longitudinal axis. The lead screw has a first end extending through the nut and a second opposite end. Rotation of the lead screw in a first direction causes the nut to travel along the lead screw towards the first end thereof and rotation of the lead screw in a second, opposite direction causes the nut to travel towards the second end thereof. A handle is provided for turning the lead screw. The handle is operatively connected to the lead screw by a clutch mechanism such that the clutch mechanism disengages the handle from the lead screw in response to the tension on the endless belt extending the predetermined maximum tension.

In accordance with a still further aspect of the present invention, a device is provided for cleaning an endless conveyor. The device includes an endless belt brush engageable with the endless conveyor. A tension mechanism provides tension on the endless brush belt and a clutch mechanism is operatively connected to the tension mechanism. The clutch mechanism prevents the placement of additional tension on the endless brush belt in response to the tension exceeding a predetermined maximum tension.

The device includes a drive sheave for driving the endless brush belt along a predetermined path and a drive sheave for guiding the endless brush belt on the predetermined path. The endless brush belt includes an inner surface and the drive sheave and the driven sheave include outer surfaces. The outer surfaces of the drive sheave and the driven sheave engage the inner surface of the endless brush belt.

The drive sheave and the driven sheave are axially spaced and the tension mechanism includes a sheave positioning structure for allowing the user to adjust the axial spacing between the drive sheave and the driven sheave. A frame extends along the longitudinal axis and supports the drive sheave and the driven sheave above a supporting surface. The driven sheave is rotatable about a shaft having a predetermined diameter which is slidable along the longitudinal axis. The tension mechanism is operatively connected to the shaft. The tension mechanism slides the shaft along the longitudinal axis between a first position providing a minimum spacing between the sheaves and a second position providing a maximum spacing between the sheaves. A locking structure interconnects the shaft to the frame at a selected position corresponding to the selected tension on the endless brush.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 4 is an exploded, top plan view of a tension mechanism for the device of FIG. 1;

FIG. 5 is a side elevational view of the device of the present invention taken along line 5—5 of FIG. 3 showing the tension mechanism in a first position;

FIG. 6 is a side elevational view, similar to FIG. 5, showing the tension mechanism in a second position;

DETAILED DESCRIPTION OF THE DRAWINGS

Figure 1:
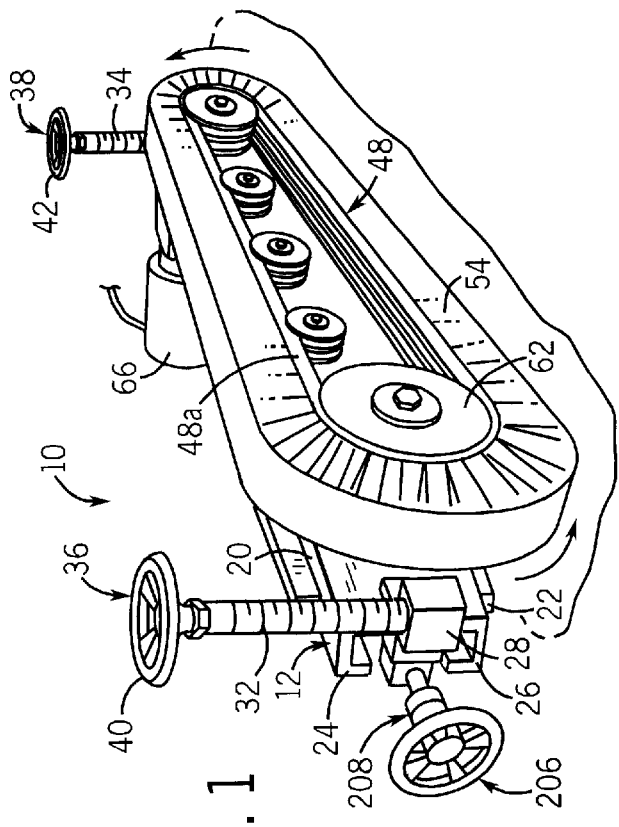
FIG. 1 is a perspective view of a device for cleaning endless conveyors in accordance with the present invention.

Referring to FIG. 1, a device for cleaning an endless conveyor is generally designed by the reference numeral 10.

Figure 2:
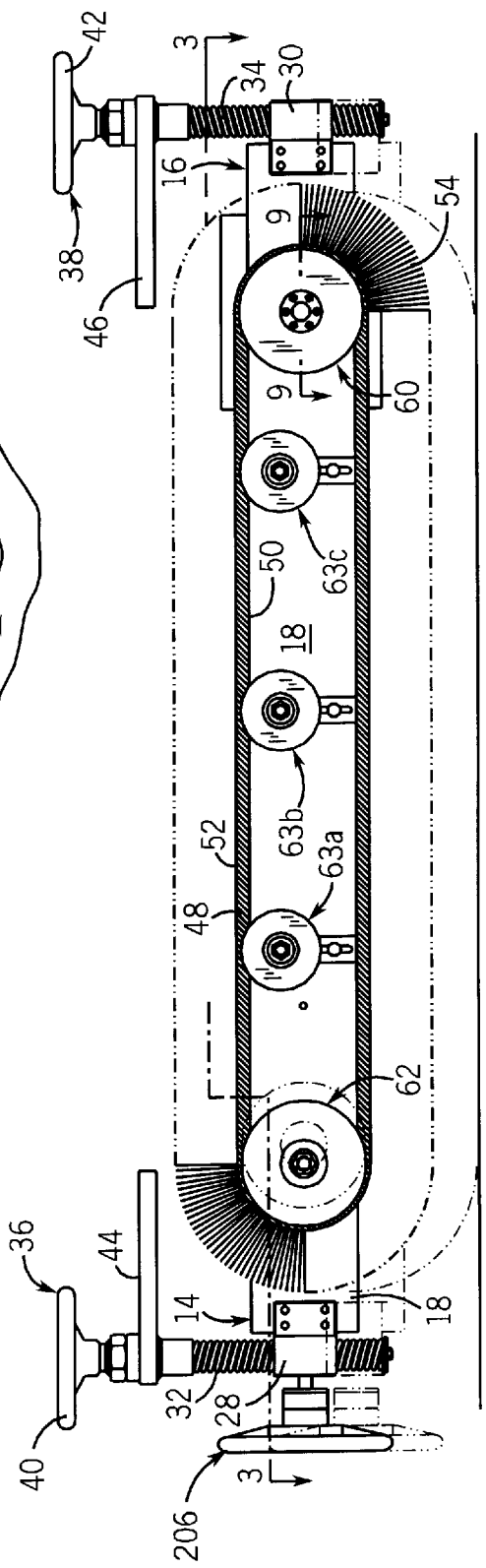
FIG. 2 is a side elevational view of the device of FIG. 1.

Device 10 includes an elongated support frame 12 having a first end 14 and a second, opposite end 16, FIG. 2. Support frame 12 includes a generally vertical support wall 18 which extends along a longitudinal axis. Support wall 18 includes upper and lower edges 20 and 22, respectively. Upper and lower generally L-shaped frame portions 24 and 26, respectively, project in a common direction from upper and lower edges 20 and 22, respectively, of support wall 18 so as to define cavity 28 therebetween in support frame 12.

Elevating screw boxes 28 and 30 are interconnected to support wall 18 and corresponding ends 14 and 16, respectively, of support frame 12. Elevating screw boxes 28 and 30 include threaded passageways therethrough for receiving corresponding threaded shafts 32 and 34, respectively, of elevating screw assemblies 36 and 38, respectively. Threaded shafts 32 and 34 depend from corresponding handles 40 and 42, respectively, which facilitate the threading of threaded shafts 32 and 34 into and out of corresponding threaded passageways in elevating screw blocks 28 and 30, respectively.

Elevating screw assemblies 36 and 38 include mounting brackets 44 and 46, respectively, which are mounted on the upper portions of corresponding threaded shafts 32 and 34, respectively, adjacent handles 40 and 42, respectively. It is intended that mounting brackets 44 and 46 be bolted or welded to a cross bar or other suitable portion of the frame of an endless conveyor, so as to support device 10 above a supporting surface. It can be appreciated that by rotating handles 40 and 42 of elevating screw assemblies 36 and 38, respectively, threaded shafts 32 and 34 may be threaded into and out of corresponding elevating screw blocks 28 and 30, thereby raising and lowering device 10 with respect to the endless conveyor frame, for reasons hereinafter described.

Figure 9:
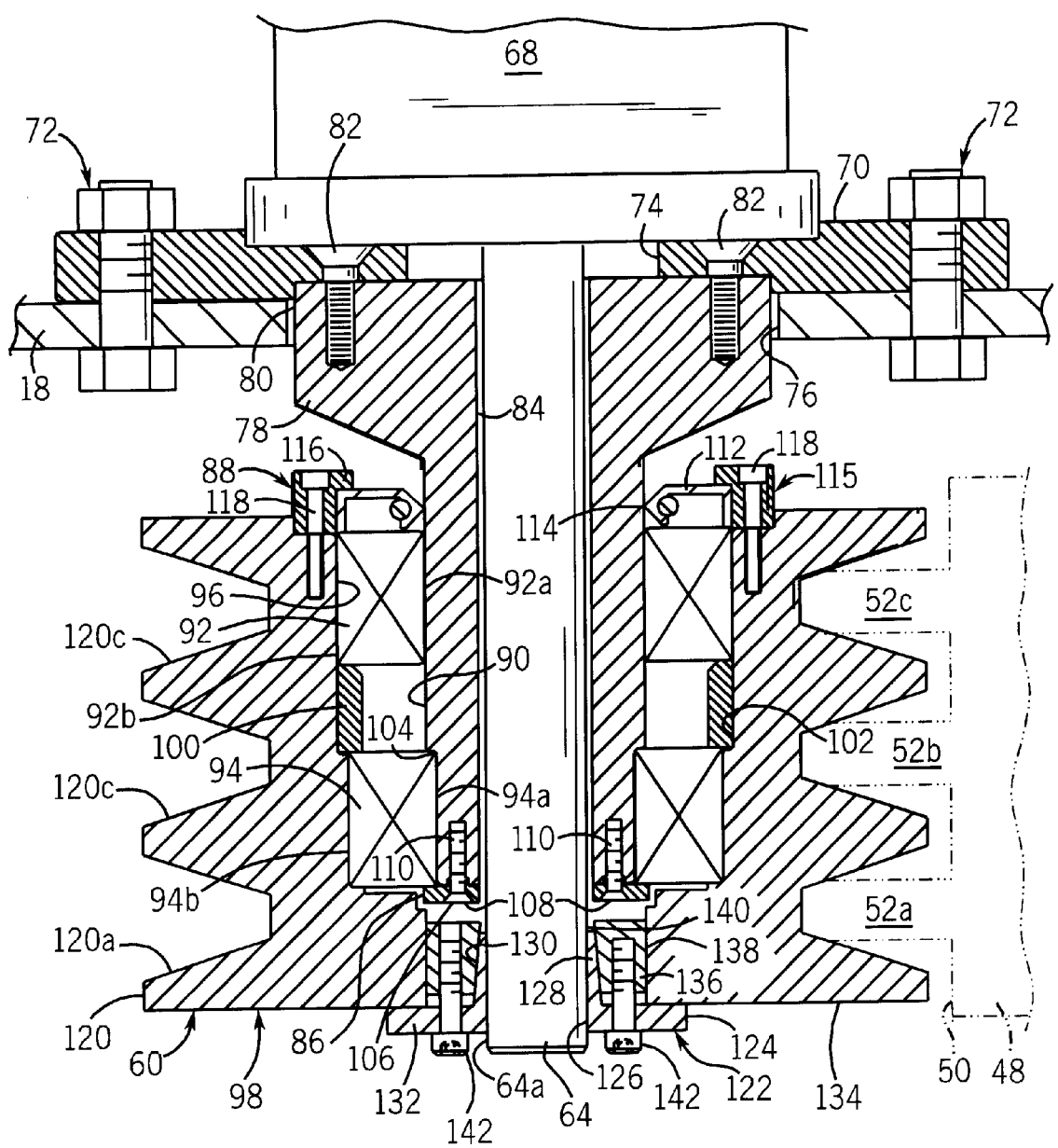
FIG. 9 is a cross sectional view of the device of the present invention taken along line 9—9 of FIG. 2.

Device 10 further includes endless brush belt 48 for cleaning the endless conveyor. Endless brush belt 48 includes an inner surface 50 having a plurality of spaced lugs 52a–c, FIG. 9, projecting therefrom. It can be appreciated that endless brush belt 48 may be formed as a plurality of separate, individual belts having correspondingly lugs projecting from the inner surface thereof without deviating from the scope of the present invention. Outer surface 52 of endless brush belt 48 includes a plurality of brushes 54 projecting therefrom. It is preferred that brushes 54 be formed of nylon or stainless steel and have relatively stiff bristles in order to loosen and remove any material adhered to the endless conveyor. However, it is contemplated that bristles 54, projecting from outer surface 52 of brush belt 48, be formed from different materials and/or have different resiliency without deviating from the scope of the present invention.

Endless brush belt 48 is supported on support frame 12 by drive sheave assembly 60 and driven sheave 62. In addition, a plurality of spaced idler sheaves 63a–c are rotatably supported by support wall 18 of frame 12 in a spaced relationship between drive sheaves assembly and driven sheave 62. Idler sheaves 63a–c include corresponding outer surfaces having grooves formed therein for receiving corresponding lugs 52a–c projecting from inner surface 50 along the upper portion 48a of endless brush belt 48 to guide endless brush belt 48 as it travels on its path.

Figure 3:
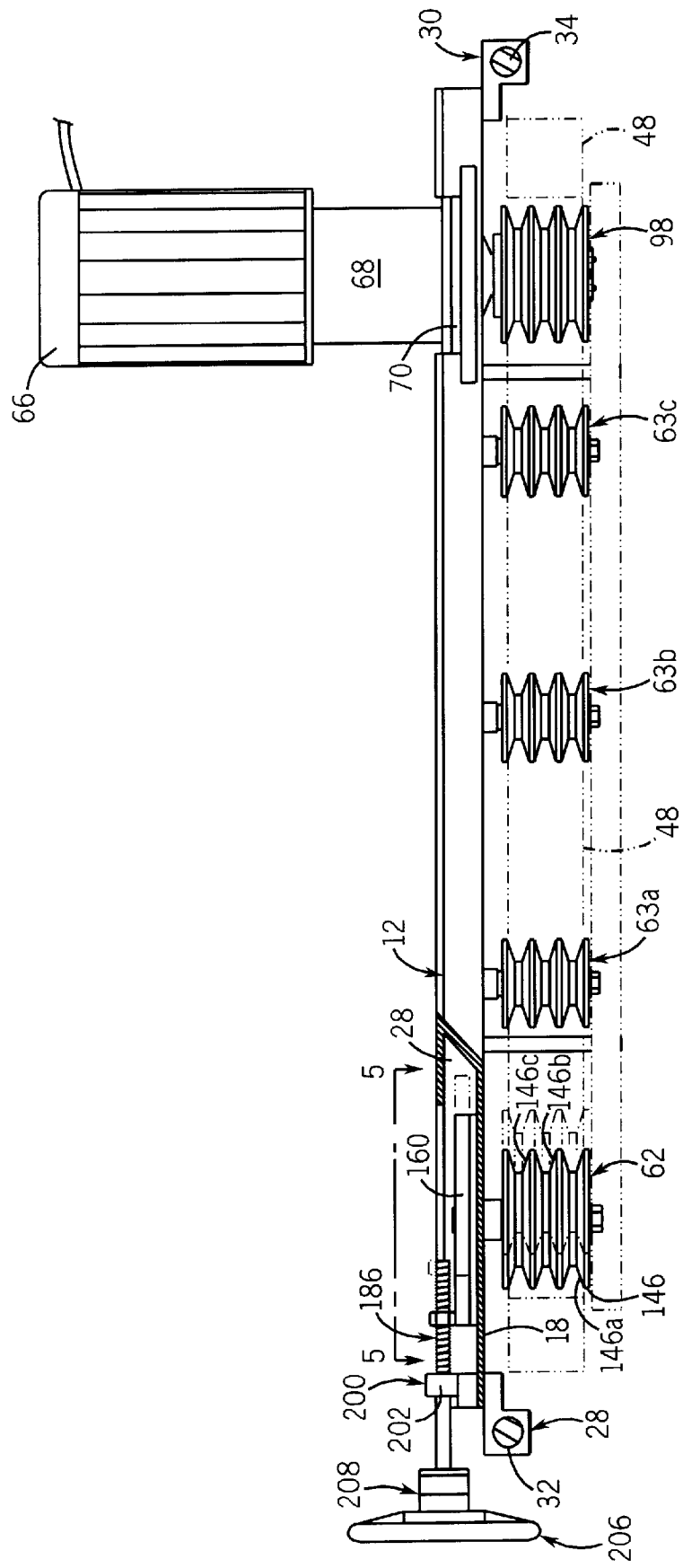
FIG. 3 is a cross-sectional view taken along line 3—3 of FIG. 2.
Figure 7:
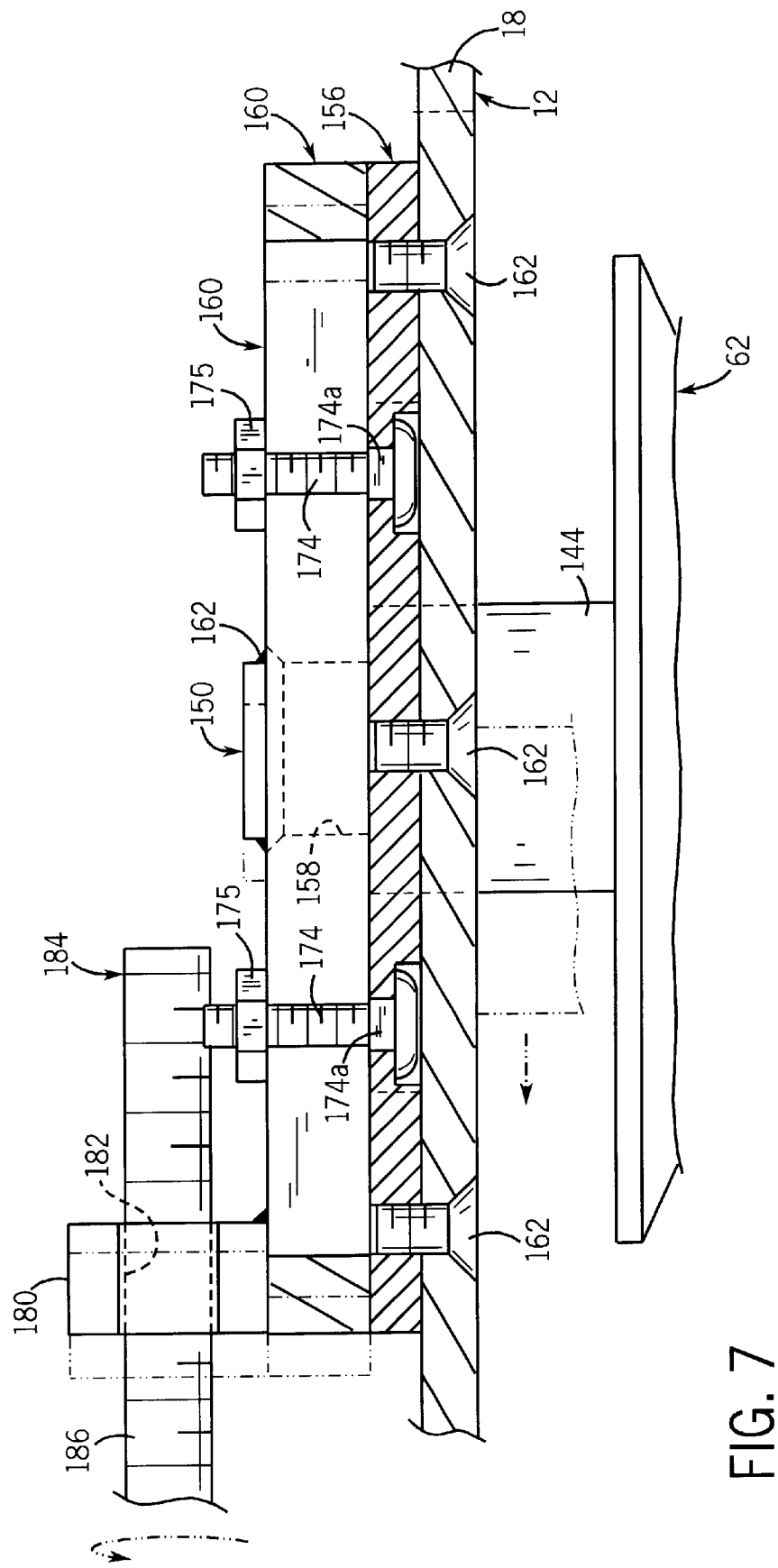
FIG. 7 is a cross sectional view of the tension mechanism taken along line 7—7 of FIG. 5.

Referring to FIGS. 1 and 3, drive sheave assembly 60 is mounted on a rotatable drive shaft 64 which is coupled to electric motor 66, FIG. 1, by gear box 68, in a conventional manner. Gear box 68 is interconnected to gear box mounting plate 70 which, in turn, is secured to support wall 18 of support frame 12 by a plurality of bolt and nut combinations 72. Gear box 68 is interconnected to gear box mounting plate 70 such that drive shaft 64 extends through central opening 74 in gear box mounting plate 70 and through drive shaft opening 76 in support wall 18 of support frame 12.

Drive sheave assembly 60 includes spindle housing 78 having inner end 80 interconnected to gear box mounting plate 70 by a plurality of flat head screws 82. Inner end 80 of spindle housing 78 has a diameter less than the diameter of drive shaft opening 76 through support wall 18 of support frame 12 so as to allow inner end 80 of spindle housing 78 to pass therethrough. Spindle housing 78 further includes an inner surface 84 which defines a passageway through spindle housing 78 from inner end 80 to outer end 86. The passageway through spindle housing 78 is of sufficient dimension to allow drive shaft 64 to pass therethrough.

Bearing assembly 88 is mounted on the outer surface 90 of spindle housing 78 adjacent outer end 86 thereof to facilitate rotation of drive sheave 98 about spindle housing 78. Bearing assembly 88 includes first and second spaced bearings 92 and 94, respectively, having inner surfaces 92a and 94a, respectively, which engage outer surface 90 of spindle housing 78. Outer surfaces 92b and 94b of bearings 92 and 94, respectively, engage inner surface 96 of drive sheave 98. Bearings 92 and 94 are separated by a bearing spacer ring 100 which is disposed therebetween. Bearing spacer ring 100 is positioned adjacent a shoulder 102 formed along the inner surface 96 of drive sheave 98. In addition, bearing 94 engages a shoulder 104 in outer surface 90 of spindle housing 78.

Bearing assembly 88 is retained on spindle housing 78 by bearing retention ring 106. Bearing retention ring 106 has a diameter greater than the diameter of outer end 86 of spindle housing 78 and includes a plurality of circumferentially spaced apertures 108 therein. Flat head screws 110 extend through apertures 108 in bearing retention ring 106 and into outer end 86 of spindle housing 78 so as to interconnect bearing retention ring 106 to spindle housing 78 and maintaining bearing assembly 88 thereon.

Seal 112 is positioned adjacent bearing 96 and has a radially inner edge 114 which engages outer surface 90 of spindle housing 78. Seal retention ring 115 includes flanged portion 116 extending radially inward towards spindle housing 78 so as to capture seal 112 between flanged portion 116 and bearing 96. A plurality of bolts 118 extend through seal retention ring 114 into drive sheave 98 so as to interconnect seal retention ring 114 thereto. It can be appreciated that by tightening seal retention ring 115 against seal 112, a preload tension may be placed on the outer surfaces 92b and 94b of bushings 92 and 94, respectively. Further, by urging bearing retention ring 106 against bearing 94, a preload tension may be placed on the inner surface 94a of bearing 94.

Drive sheave 98 includes an outer surface 120 having a plurality of grooves 120a–120c for receiving corresponding lugs 52a-52c projecting from inner surface 50 of endless brush belt 48. Drive sheave 98 is interconnected to drive shaft 64 by locking screw clamp 122. Locking screw clamp 122 includes a collar 124 positioned over drive shaft 64. Collar 124 includes an inner surface 126 frictionally engaging outer surface 64a of drive shaft 64. Collar 124 of locking screw clamp 122 includes a clamping portion 128 having radially outer tapered surface 130 and a retaining portion 132 projecting radially from clamping portion 128. Retaining portion 132 is of sufficient diameter so as to overlap a portion of end surface 134 of drive sheave 98.

Locking screw clamp 122 further includes a clamping element 136 having an outer surface 138 for engaging inner surface 96 of drive sheave 98 and an inner tapered surface 140 which forms a slidable interface with tapered surface 130 of clamping portion 128 of collar 124. A plurality of locking screws 142 extend through retaining portion 132 of collar 124 and into clamping element 136. Rotation of locking screws 142 in a first direction urges clamping element 136 away from retaining portion 132 of collar 124 such that locking screw clamp 122 may be slid onto or off of outer surface 64a of drive shaft 64. Alternatively, by rotating locking screws 142 in a second, opposite direction, clamping element 136 is drawn towards retaining portion 132 of collar 124 such that tapered surface 140 of clamping element 136 slides along tapered surface 130 of clamping portion 128 of collar 124. As clamping element 136 slides towards retaining portion 132 of collar 124, radial contact pressure is exerted by outer surface 138 of clamping element 136 on inner surface 96 of drive sheave 98. In addition, clamping pressure is exerted by inner surface 126 of collar 124 against outer surface 64a of drive shaft 64. In such a manner, drive sheave 98 is interconnected to drive shaft 64 such that rotation of drive shaft 64 is translated to drive sheave 98.

Referring to FIGS. 4–8, driven sheave 62 is rotatably mounted on a corresponding shaft 144. Driven sheave 62 includes an outer surface 146 having a plurality of grooves 146a–c formed therein for receiving corresponding lugs 52a–c extending from inner surface 50 of brush belt 48. It can be appreciated that drive sheave 62 guides endless brush belt 48 as it travels about drive sheave 98 and driven sheave 62, as hereinafter described. Shaft 144 has a terminal end 150 which extends through slot 152 formed in support wall 18 of support frame 12; through oblong opening 154 in mounting plate 156; and into a mounting aperture 158 in moving plate 160. Terminal end 150 of shaft 144 is secured within mounting aperture 158 in moving plate 160 by welding 162 or the like, FIG. 7.

Figure 8:
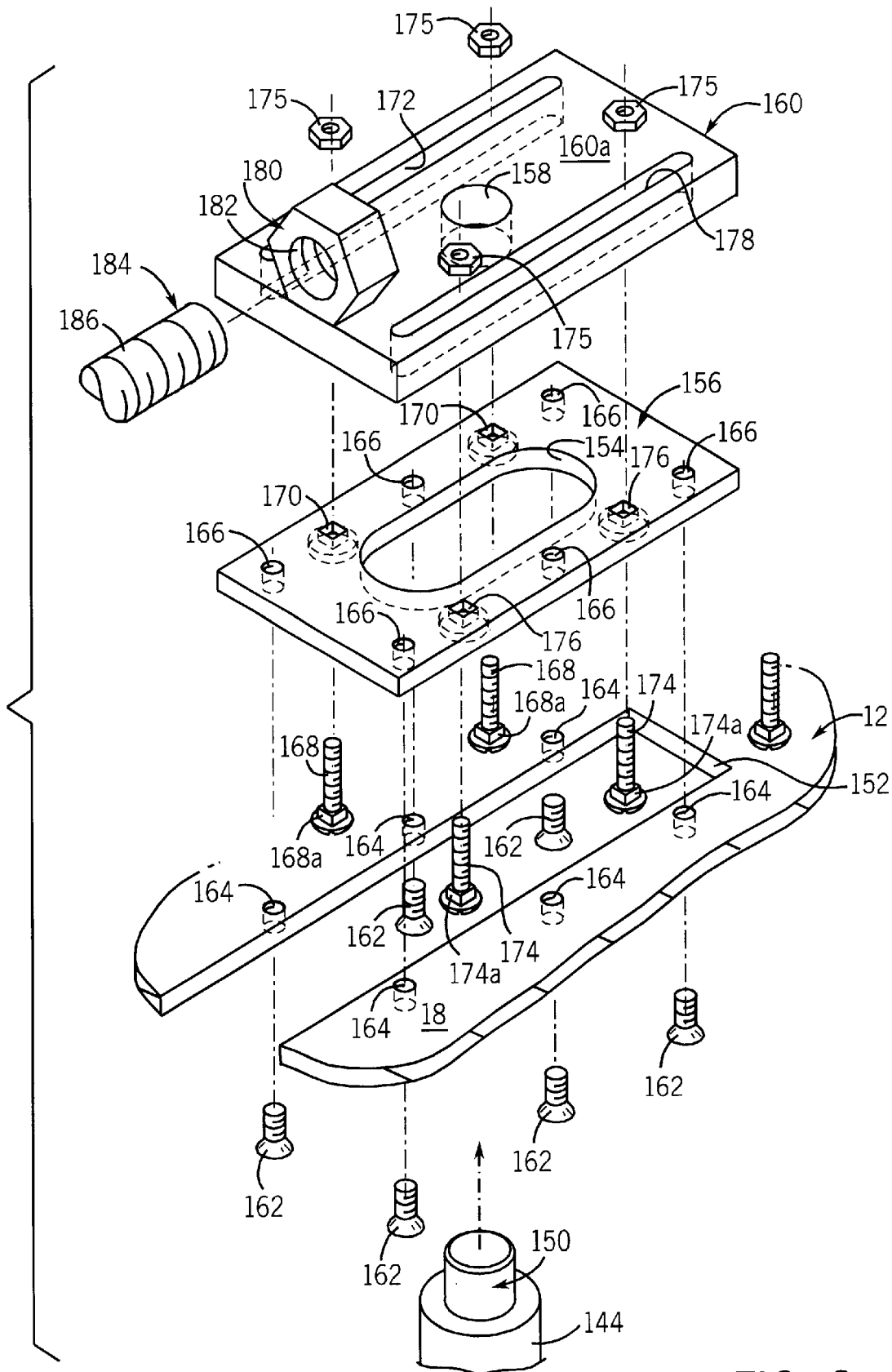
FIG. 8 is an exploded, isometric view of the portion of the tension mechanism of the device of the present invention.

As best seen in FIG. 8, mounting plate 156 is positioned over slot 152 in support frame 12 such that oblong opening 154 through mounting plate 156 is aligned with slot 152 through support wall 18 of support frame 12. A plurality of flat head screws 162 extend through corresponding apertures 164 in support wall 18 of support frame 12, and into corresponding apertures 166 in mounting plate 156 so as to rigidly connecting mounting plate 156 to support wall 18 of support frame 12.

A first pair of carriage bolts 168 extends through corresponding openings 170 in mounting plate 156 and through slot 172 in movable plate 160. Carriage bolts 168 are positioned such that necks 168a of carriage bolts 168 are seated within corresponding apertures 170 in mounting plate 158 so as to prevent rotation of carriage bolts 168. Similarly, a second pair of carriage bolts 174 extends through corresponding openings 176 in mounting plate 156 and through slot 178 in movable plate 160. Carriage bolts 174 are positioned such that necks 174a of carriage bolts 174 are seated within corresponding openings 176 in mounting plate 156 so as to prevent rotation of carriage bolts 174. Nuts 175 may be threaded onto corresponding carriage bolts 168 and 174 so as to maintain moving plate 160 thereon. It can be appreciated that by tightening nuts 175 onto corresponding carriage bolts 168 and 174, moving plate 160 may be secured at a user selected location with respect to mounting plate 156 and hence, with respect to support wall 18 of support frame 12.

It is intended that slots 172 and 178 in movable plate 160 be generally parallel such that carriage bolts 168 in slot 172 and carriage bolts 174 in slot 178 guide movement of movable plate 160 in a direction parallel to the longitudinal axis of support wall 18 of support frame 12. It can be appreciated that the slidable movement of movable plate 160 is limited by the ends of oblong opening 154 in mounting plate 156 through which terminal end 150 of shaft 144 extends.

Referring to FIGS. 4 and 8, movable plate 160 includes nut 180 mounted to first surface 160a thereof. Nut 180 has a threaded passageway 182 therethrough which extends along an axis generally parallel to the longitudinal axis of support wall 18 of support frame 12. Threaded passageway 182 through nut 180 is adapted for receiving threaded end 184 of lead screw 186. Second, opposite end 188 of lead screw 186 includes a non-threaded portion 190 and a threaded portion 192. Second end 188 of lead screw 186 is receivable within a corresponding cavity 194 in an extension shaft 196 and is interconnected thereto by threading threaded portion 192 of second end 186 of lead screw 186 into threaded portion 198 of cavity 194 in extension shaft 196. A roll pin (not shown) or the like may be used to retain second end 196 of lead screw 186 within cavity 194 of extension shaft 196 in a conventional manner.

Bearing block 200 is interconnected to support wall 18 of support frame 12 and includes bearing portion 202 having a passageway therethrough for accommodating and rotatably supporting lead screw 186. End 204 of extension shaft 196 is operatively connected to handle 206 by clutch mechanism 208. In a preferred embodiment, clutch mechanism 208 is an overload release clutch such as the "Roto-Fuse" overload release clutch manufactured and sold by Cabat Inc. of Racine, Wis. The structure and operation of the "Roto-Fuse" overload release clutch is fully described in Hansen, U.S. Pat. No. 3,893,553 which is incorporated herein by reference.

Clutch mechanism 208 is intended to provide controlled torque transmission between handle 206 and extension shaft 196. During normal operation, clutch mechanism 208 is intended to translate rotation of handle 206 in a first direction to extension shaft 196. When the torque required to rotate handle 206 in the first direction exceeds a predetermined value of a maximum torque setting prescribed by the user for clutch mechanism 208, for reasons hereinafter described, clutch mechanism 208 releases so as to allow handle 206 to rotate freely in the first direction independent of extension shaft 196. To re-engage clutch mechanism 208, handle 206 is rotated in a second, opposite direction until such times as clutch mechanism 208 snaps back into engagement. Thereafter, rotation of handle 206 in the first direction will once again be translated to extension shaft 196. It is noted that the torque controlling action of clutch mechanism 208 is unidirectional. As such, rotation of handle 206 initially in the second direction will be translated directly to extension shaft 196.

In operation, device 10 is interconnected to the frame of an endless conveyor as heretofore described. Handles 36 and 38 are rotated so as to position device 10 at a location wherein brushes 54 of endless belt 48 engage the endless conveyor. It is intended that brushes 54 of endless brush belt 48 have sufficient contact with the endless conveyor that brushes 54 may overcome the adhesion forces that maintain any residual material on the endless conveyor. However, the pressure of the brushes 54 of endless brush belt 48 against the endless conveyor must not be of sufficient magnitude as to hinder performance of the endless conveyor.

With device 10 vertically positioned with respect to the endless conveyor, handle 206 may be rotated to adjust the tension on endless brush belt 48. Rotation of handle 206 in the first direction is translated through clutch mechanism 208 to extension shaft 196, as heretofore described. Extension shaft 196, in turn, rotates lead screw 186 such that nut 180 travels on threaded end 184 of lead screw 186 towards second end 188 thereof. As nut 180 travels on threaded end 184 towards second end 188 of lead screw 186, movable plate 160 moves from right to left in FIGS. 5–6. As movable plate 160 moves from right to left in FIGS. 5–6, shaft 144, and hence, driven sheave 162 rotatably supported thereon also travels from right to left in FIG. 2 thereby increasing the tension on endless brush belt 48. When the tension on endless brush belt 48 is at a user selected level, nuts 175 are tightened onto carriage bolts 168 and 174 so as to rigidly connect movable plate 160 to mounting plate 156 which, in turn, is secured to support wall 18 of support frame 12, as heretofore described. In such manner, the tension of endless brush belt 48 may be maintained at the user selected level.

It can be appreciated that the tension on endless brush belt 48 increases as movable plate 160 moves from right to left in FIGS. 5–6 such that it may become more difficult to move movable plate 160. Consequently, the torque required to turn handle 206 in the first direction so as to cause nut 180 to travel further towards second end 188 of lead screw 186 increases. As a result, if the tension on brush belt 48 exceeds a predetermined threshold, the torque required to turn handle 206 in the first direction will exceed the maximum torque setting prescribed by the user for clutch mechanism 208. As such, clutch mechanism 208 will release such that handle 206 rotates freely independent of extension shaft 196 and the user is unable to provide any additional tension on endless brush belt 48.

As heretofore described, by rotating handle 206 in the second, opposite direction, after clutch mechanism 208 releases will cause clutch mechanism 208 to snap back into engagement and allow handle 206 to, once again, be rotated in the first direction. Alternatively, handle 206 may be rotated initially in the second, opposite direction so as to cause nut 180 to travel away from second end 188 of lead screw 186 and to cause movable plate 160 to slide from left to right in FIGS. 5–6. Once again, when the tension provided on endless brush belt 48 is desired at user level, nuts 175 may be tightened onto corresponding carriage bolts 168 and 174 so as to rigidly connect movable plate 160 to mounting plate 156, and hence, to support wall 18 of support frame 12.

With the tension on endless brush belt 48 at a proper, user selected level, electric motor 66 may be actuated so as to rotate drive shaft 64 through gear box 68. Rotation of drive shaft 64 is translated to drive sheave 98 through locking screw clamp 122. Drive sheave 98 drives endless brush belt 48 about driven sheave 62 and idler sheaves 63a–c in a conventional manner. Brushes 54 projecting from outer surface 52 of endless brush belt 48 engage and move across the underside of the endless conveyor so as to disengage any of the bulk material adhered thereto.

Various modes of carrying out the invention are contemplated as being within the scope of the following claims particularly pointing out and distinctly claiming the subject matter which is regarded as the invention.

We claim:

1. A device for cleaning an endless conveyor, comprising:
   first and second sheaves spaced along a longitudinal axis and rotatably supported above a supporting surface, each sheave being rotatable about a corresponding axis transverse to the longitudinal axis and including a radially outer surface;
   an endless brush belt extending about the radially outer surfaces of the sheaves and having an outer surface engagable with the endless conveyor, the endless brush belt traveling about the sheaves in response to rotation of the first sheave;
   a drive structure operatively connected to the first sheave for rotating the first sheave;
   a tension mechanism operatively connected to one of the sheaves for adjusting the spacing therebetween and providing a tension on the endless brush belt; and
   a clutch mechanism operatively connected to the tension mechanism, the clutch mechanism releasing the tension mechanism from the one of the sheaves so as to prevent the placement of additional tension on the endless brush belt in response to the tension exceeding a predetermined maximum tension.

2. The device of claim 1 wherein the sheaves are supported above the supporting surface at a user selected height and wherein the device further includes a height adjustment mechanism operatively connected to at least one of the sheaves for allowing a user to adjust the sheaves to the user selected height.

3. The device of claim 1 further comprising a frame generally parallel to the longitudinal axis for supporting the sheaves above the supporting surface and wherein the second sheave is rotatable about a shaft having a predetermined diameter and a terminal end, the shaft slidable along the longitudinal axis.

4. The device of claim 3 wherein the tensioning mechanism is operatively connected to the shaft, the tensioning mechanism sliding the shaft along the longitudinal axis between a first position providing minimum spacing between the sheaves and a second position providing maximum spacing between the sheaves.

5. The device of claim 4 further comprising a locking structure for interconnecting the shaft to the frame at a user selected position along the longitudinal axis.

6. The device of claim 3 wherein the frame includes an opening therethrough and wherein the shaft extends through the opening in the frame.

7. The device of claim 6 wherein the tensioning mechanism includes a plate interconnected to the terminal end of the shaft and slidable along the frame, the plate slidable along the frame between a first position providing a minimum spacing between the sheaves and a second position providing a maximum spacing between the sheaves.

8. The device of claim 7 wherein the tensioning mechanism includes a locking structure for maintaining the plate at a user selected position with respect to the frame.

9. The device of claim 8 wherein the tensioning mechanism includes:
   a nut extending from a first side of the plate; and
   a lead screw rotatable about an axis generally parallel to the longitudinal axis and having a first end extending through the nut and a second opposite end;
   wherein rotation of the lead screw in a first direction causes the nut to travel along the lead screw towards the first end thereof and rotation of the lead screw in a second, opposite direction causes the nut to travel towards the second end thereof.

10. The device of claim 9 further comprising a handle for turning the leading screw, the handle interconnected to the lead screw by the clutch mechanism such that handle is prevented from turning the lead screw in response to the tension on the endless brush belt exceeding the predetermined maximum tension.

11. A device for cleaning an endless conveyor, comprising:
- a support frame extending along a longitudinal axis and having first and second opposite ends, the support frame being supported above a supporting surface;
- a rotatable drive shaft extending laterally from the support frame along an axis transverse to the longitudinal axis of the support frame;
- a drive sheave assembly supported on the drive shaft, the drive sheave assembly including:
    - a spindle housing having an inner surface defining a passageway for receiving the drive shaft therethrough and an outer surface, the spindle housing being connected to the support frame;
    - a drive sheave having an inner surface and an outer surface;
    - a bearing assembly positioned between the outer surface of the spindle housing and the inner surface of the drive sheave to facilitate rotation of the drive sheave on the spindle housing; and
    - a clamping structure for interconnecting the drive sheave and the drive shaft;
- a driven sheave rotatably supported by the support frame at a spaced location from the drive sheave, the driven sheave rotatable about a corresponding axis transverse to the longitudinal axis and including a radially outer surface;
- an endless brush belt extending about the radially outer surfaces of the drive sheave and the driven sheave and having an outer surface engagable with the endless conveyor, the endless brush belt traveling about the sheaves in response to rotation of the drive shaft;
- a drive mechanism operatively connected to the drive shaft for rotating the drive shaft;
- a tension mechanism operatively connected to the driven sheave for adjusting the spacing between the drive sheave and the driven sheave so as to provide a tension on the endless brush belt; and
- a clutch mechanism operatively connected to the tension mechanism, the clutch mechanism disconnecting the tension mechanism from the driven sheave in response to the tension exceeding a predetermined maximum tension so as to prevent the adding of additional tension on the endless brush belt.

12. The device of claim 11 wherein the clamping structure includes a locking screw clamp positioned about the outer surface of the drive shaft and including an outer contact surface for frictionally engaging the inner surface of the drive sheave, the locking screw clamp having an outer diameter which is adjustable between a first reduced diameter and a second enlarged diameter wherein rotation of the drive shaft is translated to the drive sheave.

13. The device of claim 11 wherein the driven sheave is rotatably supported on a driven shaft extending laterally from the support frame, the driven shaft having a predetermined diameter and being slidable along the longitudinal axis of the support frame.

14. The device of claim 11 wherein the tensioning mechanism is operatively connected to the driven shaft, the tensioning mechanism sliding the driven shaft along the longitudinal axis of the support frame between a first position providing minimum spacing between the drive sheave and the driven sheave and a second position providing maximum spacing between the drive sheave and the driven sheave.

15. The device of claim 14 further comprising a locking structure for interconnecting the driven shaft to the frame at a user selected position along the longitudinal axis.

16. The device of claim 11 wherein the support frame includes an opening therethrough and wherein the driven shaft extends through the opening in the frame.

17. The device of claim 16 wherein the tensioning mechanism includes a plate interconnected to a terminal end of the driven shaft, the plate slidable along the support frame between a first position providing a minimum spacing between the drive sheave and the driven sheave and a second position providing a maximum spacing between the drive sheave and the driven sheave.

18. The device of claim 17 wherein the tensioning mechanism includes a locking structure for maintaining the plate at a user selected position with respect to the support frame.

19. The device of claim 18 wherein the tensioning mechanism includes:
- a nut extending from a first side of the plate; and
- a lead screw rotatable about an axis generally parallel to the longitudinal axis and having a first end extending through the nut and a second opposite end;
- wherein rotation of the lead screw in a first direction causes the nut to travel along
- the lead screw towards the first end thereof and rotation of the lead screw in a second, opposite direction causes the nut to travel towards the second end thereof.

20. The device of claim 19 further comprising a handle for turning the lead screw, the handle operatively connected to the lead screw by the clutch mechanism such that the clutch mechanism disengages the handle from the lead screw in response to the tension on the endless brush belt exceeding the predetermined maximum tension.

21. A device for cleaning an endless conveyor, comprising:
- an endless brush belt engagable with the endless conveyor;
- a drive sheave for driving the endless brush belt along a predetermined path and a driven sheave for guiding the endless brush belt on the predetermined path;
- a tension mechanism operatively connected to the driven sheave for providing a tension on the endless brush belt; and
- a clutch mechanism operatively connected to the tension mechanism, the clutch mechanism disconnecting the tension mechanism from the driven sheave in response to the tension exceeding a predetermined maximum tension so as to prevent the placement of additional tension on the endless brush belt.

22. The device of 21 wherein:
- the endless brush belt includes an inner surface;
- the drive sheave includes an outer surface engaging the inner surface of the endless brush belt;
- the driven sheave includes an outer surface engaging the inner surface of the endless brush belt; and
- wherein the drive sheave and the driven sheave are axially spaced.

23. The device of claim 22 where the tension mechanism includes a sheave positioning structure for allowing a user to vary the axial spacing between the drive sheave and the driven sheave.

24. The device of claim 21 further comprising a frame extending along longitudinal axis for supporting the drive sheave and the driven sheave above a supporting surface and wherein the driven sheave is rotatable about a shaft having a predetermined diameter which is slidable along the longitudinal axis.

25. The device of claim 24 wherein the tensioning mechanism is operatively connected to the shaft, the tensioning mechanism sliding the shaft along the longitudinal axis between a first position providing a minimum spacing between the sheaves and a second position providing a maximum spacing between the sheaves.

26. The device of claim 25 further comprising a locking structure for interconnecting the shaft to the frame at a selected position corresponding to a selected tension on the endless brush belt.

* * * * *